United States Patent [19]

Hirsch

[11] Patent Number: 4,798,549
[45] Date of Patent: Jan. 17, 1989

[54] SURFBOARD AND METHOD OF MAKING SAME

[76] Inventor: Mark D. Hirsch, 1233 Oak Avenue, Carlsbad, Calif. 92008

[21] Appl. No.: 59,326

[22] Filed: Jun. 8, 1987

[51] Int. Cl.⁴ .................................................. B63H 9/06
[52] U.S. Cl. ..................................... 441/74; 264/45.4; 114/39.2
[58] Field of Search ..................... 441/65, 74; 114/357, 114/39.2; 264/45.4, 46.6, 46.4, 46.8, 46.9, 45.2

[56] References Cited

U.S. PATENT DOCUMENTS

| 3,301,927 | 1/1967 | Exley et al. | 264/45.4 |
| 3,414,919 | 12/1968 | Gust | 441/74 |
| 4,276,844 | 7/1981 | Fremont | 114/357 X |
| 4,556,003 | 12/1985 | Prade | 441/74 |

FOREIGN PATENT DOCUMENTS 0188625  11/1983  Japan .................... 441/74

Primary Examiner—Sherman D. Basinger
Assistant Examiner—Edwin L. Swinehart
Attorney, Agent, or Firm—Baker, Maxham & Jester

[57] ABSTRACT

A surfboard body is built around a hollow stringer which is used for the injection of a lightweight foam into a mold and for providing the support for the lightweight board. One embodiment includes a hard lightweight shell covering the body. Another embodiment includes an air bag built around a stringer.

20 Claims, 2 Drawing Sheets

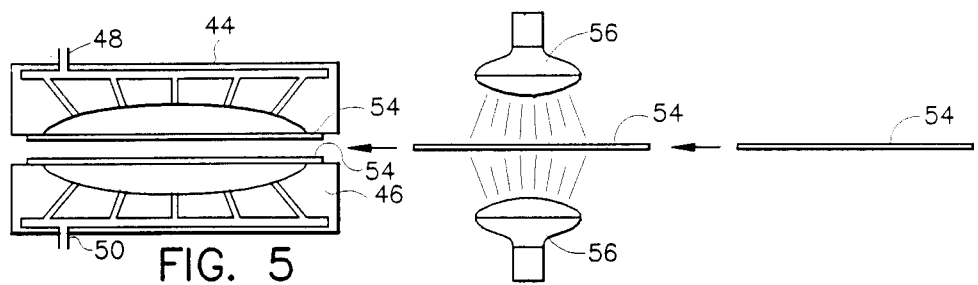
FIG. 5
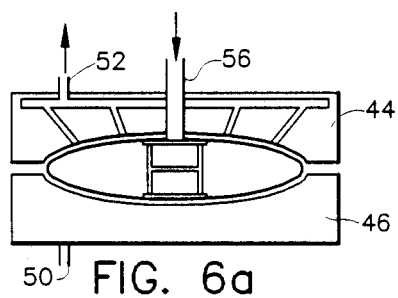
FIG. 6a
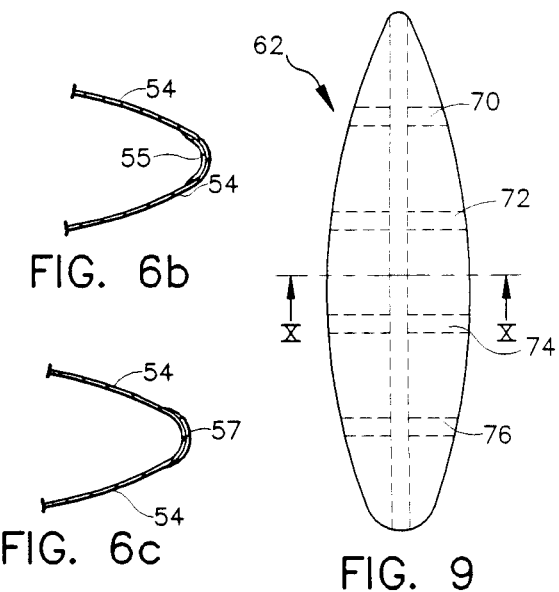
FIG. 9
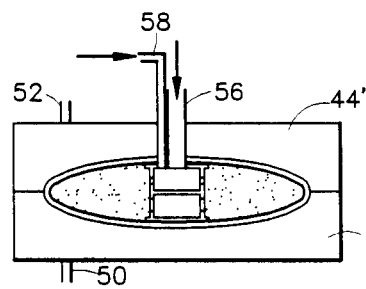
FIG. 7
FIG. 6b
FIG. 6c
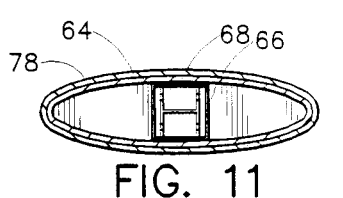
FIG. 10
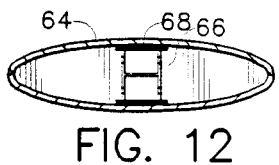
FIG. 11
FIG. 12
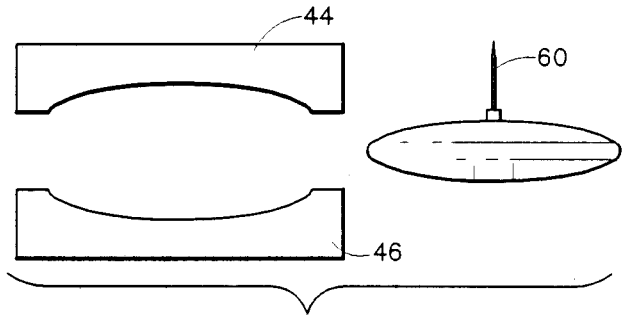
FIG. 8

SURFBOARD AND METHOD OF MAKING SAME

BACKGROUND OF THE INVENTION

The present invention relates to surfboards and pertains particularly to a high strength, lightweight surfboard and method of making same.

Surfing has increased considerably in popularity in recent years and has become a major sport. As the popularity of surfing has increased, so have refinements and design changes in the structure and methods of manufacturing of surfboards. Most of the changes are directed toward making the boards smaller, lighter, stronger and improving the shape thereof.

In the early days of surfing, surfboards were shaped out of wood blanks. As foam and fiberglass technology developed, boards began to be shaped from foam blanks carved to shape and covered with fiberglass to form a hard durable shell. Most surfboards are currently still manufactured by this method. The shell typically provides a protective coating for the core, which is the principal strength of the board. This approach to manufacturing of surfboards is labor intensive, and expensive. The boards manufactured in this manner are lighter than boards of the past, but not as durable as desired.

Such conventional boards, although much lighter than boards of the past, are still not as durable as desirable. Moreover, the fiberglass skin is not ding and puncture proof.

The ideal characteristics for an ultimate ideal high performance surfboard are a minimum weight (five to eight pounds), high ultimate strength, a very tough ding and puncture proof skin, strong rails, an attractive high gloss finish with a slick surface to enhance speed, and finally a low cost.

Accordingly, it is desirable that lighter and stronger surfboards and simple and inexpensive manufacturing methods be available therefor.

SUMMARY AND OBJECTS OF THE INVENTION

It is the primary object of the present invention to provide an improved surfboard and method of manufacture of same.

In accordance with the primary aspect of the present invention, a surfboard is built around a stringer having passages for injecting foam either into a mold or into a shell around the stringer for low cost manufacture of high strength surfboards.

BRIEF DESCRIPTION OF THE DRAWING

The above and other objects and advantages of the present invention will become apparent from the following description when read in conjunction with the accompanying drawing wherein:

FIG. 5-8 illustrate an alternate process and board construction; and

FIG. 9 illustrates another board construction; and

FIG. 10 is a section view taken on line X—X of FIG. 9.

DETAILED DESCRIPTION OF A PREFERRED EMBODIMENT

Figure 1:
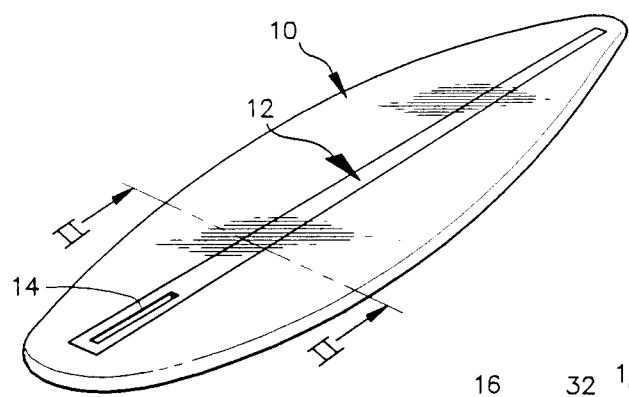
FIG. 1 is a perspective view showing a surfboard body in accordance with the invention.

Referring to FIG. 1 of the drawings, there is illustrated a typical construction of a board in accordance with the invention. The heart of the board, in accordance with the present invention, comprises a hollow stringer which extends along the length of the board, and may be provided with arms extending outward to substantially the edges or rails of the board. The stringer is of a high strength lightweight material, such as plastic, plastic reinforced fiberglass, aluminum or other suitable materials. The stringer may be formed such as in a box beam section or a flanged I-beam section with a hollow core, preferably being arranged to have an inlet port at a position, such as for example the skeg or fin box area, with a plurality of exit ports along the length thereof.

The stringer may have arms that communicate with the main branch such that, as will be further explained, foam or steam and foam for forming of the body of the board may be injected in and along the stringer and its branches.

Three predominant forms of construction are contemplated in the present invention. One embodiment is contemplated with the skin of the board being preferably of a high strength durable material, such as a polycarbonate sheet such as that sold under the trademark Lexan. This material has a very high puncture resistance, strength and can be obtained in clear transparent sheets. The material is not as brittle as fiberglass and has some flexibility.

Figure 2:
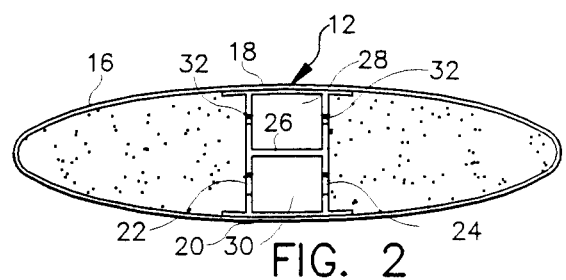
FIG. 2 is a section view taken on line II—II of FIG. 1.

In accordance with one embodiment of the invention, as illustrated in FIGS. 1 and 2, a foam blank or body 10 is formed around a stringer 12. The stringer 12 is provided with a fin box 14 for mounting a fin assembly. The board as illustrated may be used in the form, as shown in FIG. 1, or it may be coated with a suitable coating or a shell, as shown in FIG. 2. Where a closed cell foam is used, the board may be used as it comes out of the mold without the necessity of any coating or hard shell. However, it may be desirable to add a coating or shell. A coating may be thin and flexible, such as impervious Vinyl or the like, which may be applied in any number of ways.

As illustrated in FIG. 2, a hard shell or coating 16, such as fiberglass or the like, may be applied to the molded core or blank 10. The shell or coating 16 may also be made of other materials, such as polycarbonate as described above.

Figure 3:
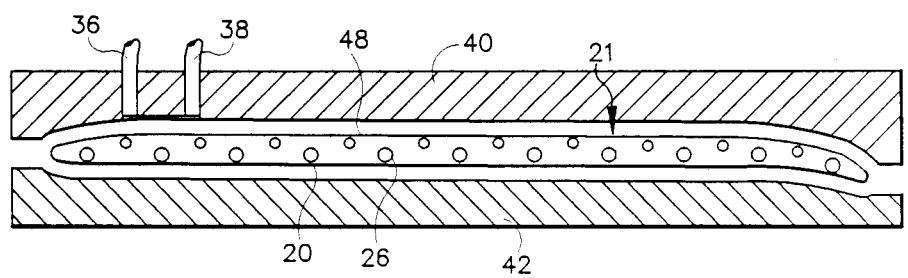
FIG. 3 is a side elevation view in section showing a stage of the molding process.
Figure 4:
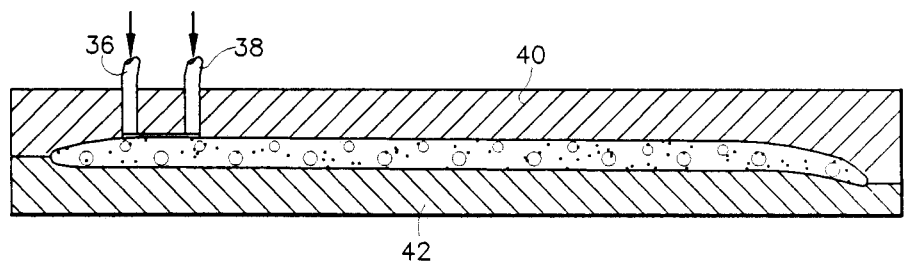
FIG. 4 is a view like FIG. 3 illustrating a further stage in the process of molding a surf board.

The formation of the foam body may be carried out as illustrated in FIGS. 3 and 4. In this process, a suitable stringer 12 is selected to be box-like or tubular with top and bottom walls 18 and 20, with a pair of side walls 22 and 24 forming the beam. A horizontal wall 26 divides the beam into upper and lower passages 28 and 30. The upper passage 28 is provided with a plurality of ports 32 along the walls thereof for the injection of steam into the mold cavity. The lower passage 30 has larger ports 34 in the walls thereof, which enable the introduction of foam pellets into the mold before the introduction of steam, as will be explained. The stringer is provided with inlet ports, such as in the fin box area, for the connection to sources of foam pellets 36 and steam 38, as shown in Fig. 3. The steam port may also be in other positions and later plugged.

The preferred method contemplates a process of formation wherein a pair of opposed female molds 40 and 42 are disposed to be open, as seen in FIG. 3. A suitable stringer 12 is selected and placed in the mold. The mold is then closed and foam pellets are injected via conduit 38 into the mold cavity through the stringer 12. The mold is then closed and steam injected via inlet 36 to generate and cure the foam. The board is allowed to cure and is then removed. The stringer may also be coated with a glue if desired prior to placement in the mold to insure a greater adherence of the foam to the stringer.

An alternate method and structure is illustrated in FIGS. 5–8. The mold is preferably formed of upper and lower halves 44 and 46 to serve both as a vacuum forming mold and as an injection mold. In this connection, the mold is formed with vacuum manifolds and lines 48 and 50 to connect to a source of vacuum 52. The process includes selecting precut shell sheets 54, which may be preheated by heat sources 56, such as lamps or the like, and placed in the mold (FIG. 3). The process continues with the vacuum for drawing the sheets to the mold configuration. While the sheets forming the skin of the board are in place, a stringer is inserted in the lower mold and preferably is coated with a suitable adhesive along the surfaces engaging the skin for bonding to the skin.

The board can be completed by suitable finishing of the joints of the skin to form a hollow board, as shown in FIGS. 6a and 6b. The skin or shell can be transparent to provide a see-through board for use in scuba or skin diving or the like.

The board can also be foam filled, with other surfaces of the stringer being preferably coated with an adhesive for high strength adhesion to the foam that is to be molded within the cavity. The hollow stringer also insures that it is well interlocked into the foam body, with the foam extending into the core of the stringer through the many ports therein.

The board can thus be finished from the FIG. 6 stage or the FIG. 7 stage. The two half shells are preferably trimmed to fit along the matching edges, and a suitable strip may be bonded, overlapping this seal on the interior of the shell by a process of placing an adhesive strip or a strip 55 that has been coated with a suitable adhesive inside the shell to match with the joint enclosing the mold on the shell and the like (at the FIG. 6a stage). In one approach to this, a vacuum port or plurality of ports are communicated to the shell adjacent the joint between the shell, such that a vacuum may be drawn for drawing the sealing strip 55 tight against the inside surface of the shells at the joint thereof. This provides a high strength bond once the adhesive sets up.

Another approach is to apply a sealing or finishing strip 57 to the exterior of the joint, as illustrated in FIG. 6b. The exterior strip 57 may be a permanent strip or it may be a high strength tape that is removable when desired.

Prior to closing of the mold, styrofoam pellets may be loaded in the shell of sufficient amount to completely fill the shell when steamed. After the mold is closed, the steam connections 58 are provided at for example the fin box area (e.g. FIG. 6) for injection steam into the center of the stringer. The steam flows through the stringer and out the many ports therein into the inner surface of the cavity formed by the shell. The steam causes the styrofoam pellets to react, forming a foam filling the interior of the board. A vent port for the fitting of the steam and air can be provided as a plug in the top surface of the board. Once the steam has been injected, the board is allowed to set up and then removed from the mold and a fin assembly may then be installed in the fin box 14.

This process can be carried out to a further stage wherein the molds slightly modified and designated 44' and 46' are provided with a pellet conduit 56 and a steam conduit (FIG. 7). The double passage stringer 12, as previously described, can then be used and foam pellets and steam injected into the hollow body, as previously described.

The above described structure provides a high strength, low weight, and hard surface surfing board that can be constructed by a highly efficient manufacturing process. The manufacturing process is such to enable the manufacture of boards of a high strength and durability at a low cost.

Another embodiment of the invention is formed in a similar fashion, as in FIGS. 1 and 2, by placing the stringer inside the female molds of FIGS. 5–8 in the absence of a shell. The shell may be preformed in the same mold or in another mold and added later to a molded foam body, which is molded around the stringer. The stringer is placed in the mold cavity, and the cavity filled with a suitable amount of polystyrene pellets. The mold is then closed and steam injected, as previously described, through the ports of the stringer. The foam forms in the cavity of the mold around the stringer, thus forming a high strength blank or body. The foam body may be removed, and if of an appropriate foam, such as a R-cell foam, may be utilized as is. In the alternative, it may be suitably coated with a waterproof material and may be used.

Various foams can be used and at different densities to obtain desired strength and buoyancy characteristics. A foam known as R-Cell is now available and can be formed in different densities. This is suitable for boards without a hard shell in that a number of different densities can be molded.

A further modification of the board would be the application of preformed shell halves, as above described, to the foam body. This is accomplished by preforming shells of a high strength polycarbonate or the like, as previously described, to fit the foam body. A high strength adhesive is coated on the body and the interior of the shells, and the shells clamped around the body. Suitable sealing means may be applied along the joint, such as a high strength tape or other means.

It is also contemplated that surfing boards may be constructed around the aforementioned or a modified stringer by means of inflatable airbags formed to fit and be supported by the stringer, as illustrated in FIGS. 9 and 10. These bags would have suitable sleeves or pockets for receiving the stringer and the arms thereof, such that the stringer provides the backbone or skeleton of the board. The board shell is of an inflatable material, such as a very thin Mylar, Vinyl or the like.

Referring to FIGS. 9 and 10, a board 62 comprises an outer bag 64, having the desired configuration with a longitudinal sleeve 66 extending along the length thereof. A stringer 68, which may be either an I-beam or a box beam shape, may be inserted in the sleeve, and the skin and the bag sealed and bonded to the stringer. The stringer may also have ribs 70–76, in which case the bag or shell would be constructed as two half shells separable along the longitudinal center, with outwardly extending sleeves for receiving the ribs. The two shells would be placed on the stringer structure and overlapped and bonded at the center. The bag would be made of either elastic or a non-elastic material and may vary in thickness from about five up to about fifty mils in thickness.

An additional feature would be the installation of a hard shell 78 over the combined inflatable body supported by the stringer skeleton, as illustrated in FIG. 11. With this arrangement, the internal bag 64 prevents water from filling the shell if it should develop a leak. The above described process provides a high strength, low weight board construction.

The polystyrene foam board can be molded tighter than the weight of polyurethane boards. The polystyrene can be shot into the board at different densities. The densities for example can vary from one up to two pounds per cubic foot or more. Alternatively, the core body can be formed of a material known as R-Cell, which is a cross between polystyrene and polyethelyne, and can also have different densities.

The molded blank can be either covered with or constructed with many different coverings. For example, it can be dip coated with Vinyl or other materials after formation. It can also be molded into Vinyl, Mylar or the like bags or other coverings in the mold. That is, the air bags can be placed in the mold with the stringers in place, and the foam can then be injected into the bag. Combinations of covers may also be provided wherein the top is a soft covering, such as Vinyl, and the bottom is a hard shell, such as polycarbonate.

Referring to FIG. 12, a construction is illustrated wherein a board is constructed of a foam blank 80 constructed around a stringer 82, as previously described, with a soft top covering 84 and a hard bottom portion 86. After the blank is completed, a lower hard half shell 86 may be applied to the bottom, and an upper or top soft covering of Vinyl, Mylar or the like 84 can be applied. Alternatively, this embodiment can be formed in the mold by placing the shell and Vinyl cover in the mold along with the stringer and then injecting the foam.

The stringer enables the construction of a board with a much thinner outer shell and therefor much lighter in overall weight.

The applicant also envisions an embodiment wherein the the air bag embodiment, as above described, would be provided with a carrying case formed of the shell, as disclosed in FIGS. 5-7. This shell would be provided with hinges and latches to serve as a protective shell for this and other boards. The air bag embodiments may also function as air mattresses, balloons, and other toys or promotional items when the stringer is removed. They can be inflated with any suitable gas, such as air or lighter than air gases such as helium and the like. They can also be carried partially inflated in carrying bags for conventional boards for protecting the boards and be available for other uses as described.

While I have illustrated and described my invention by means of specific embodiments, it is to be understood that numerous changes and modifications may be made therein without departing from the spirit and scope of the invention as defined in the appended claims.

I claim:

1. A surfboard comprising:
   an elongated stringer having a forward end, a rear end, and upper and lower surfaces curved generally to the longitudinal profile of a surfboard;
   a passage formed into and extending along substantially the length of said stringer;
   outlet ports spaced along said stringer and communicating with said passage;
   a fin box formed in said stringer at the rear end thereof and communicating with said passage;
   said passage, said ports, and said fin box being constructed and arranged for the introduction of at least one of foam and steam therethrough for introduction into a space adjacent said stringer; and
   a three dimensional body formed around said stringer and having top and bottom outer surfaces defining a surfboard configuration.

2. A surfboard according to claim 1 further comprising:
   a polycarbonate shell covering the outer surface of said body.

3. A surfboard according to claim 2 wherein:
   said upper and said lower surfaces of said stringer are bonded to inner surfaces of a shell.

4. A surfboard according to claim 3 wherein:
   said foam body is formed by a process of foaming in said shell.

5. A surfboard according to claim 1 wherein:
   said body is formed of a polystyrene foam in a density of between one and two pounds per cubic foot.

6. A surfboard according to claim 1 wherein:
   said body is foam comprising a combination of polystyrene and polyurethane.

7. A surfboard according to claim 1 wherein:
   said outer surfaces are formed of a polycarbonate, and said body further comprises an inner inflatable flexible bag.

8. A surfboard according to claim 1 wherein:
   said top outer surface is of a flexible material and said bottom outer surface is rigid.

9. A surfboard comprising:
   an elongated stringer having a forward end, a rear end, and upper and lower surfaces curved generally to the longitudinal profile of a surfboard;
   a passage formed into and extending along substantially the length of said stringer;
   outlet ports spaced along said stringer and communicating with said passage;
   a fin box formed in said stringer at the rear end thereof and communicating with said passage;
   a three dimensional body formed around said stringer and having top and bottom outer surfaces defining a surfboard configuration; and
   said body is an air bag and includes a plurality of sleeves for receiving said stringer which includes arms that extend outward from opposite sides thereof.

10. A surfboard comprising:
    an elongated stringer having a forward end, a rear end, and upper and lower surfaces curved generally to the longitudinal profile of a surfboard;
    a passage formed into and extending along substantially the length of said stringer;
    outlet ports spaced along said stringer and communicating with said passage;
    a fin box formed in said stringer at the rear end thereof and communicating with said passage; and
    said stringer includes means defining a pair of parallel upper and lower passages, one of said passages having ports for injecting foam pellets into said mold and the other passage having ports for injecting steam into said mold, both of said passages accessible from said fin box.

11. A surfboard comprising:
an elongated box-like stringer having a forward end, a rear end, and upper and lower surfaces curved generally to the longitudinal profile of a surfboard;
an upper passage and a lower passage extending along substantially the length of said stringer;
outlet ports spaced along said stringer and communicating with said passages;
a fin box formed in said stringer at the rear end thereof and communicating with said passages; and
a three dimensional foam body formed around said stringer and having top and bottom outer surfaces defining a surfboard configuration.

12. A surfboard according to claim 11 further comprising:
a polycarbonate shell covering the outer surface of said foam body.

13. A surfboard according to claim 12 wherein:
said foam body is polystyrene in a density of between one and two pounds per cubic foot.

14. A surfboard according to claim 12 wherein:
said foam body is a combination of polystyrene and polyurethane.

15. A surfboard according to claim 11 wherein:
said stringer has arms that extend outward from both sides of the central body thereof.

16. A surfboard according to claim 12 wherein:
said upper and said lower surfaces of said stringer are bonded to inner surfaces of a shell.

17. A surfboard according to claim 16 wherein:
said foam body is formed by a process of foaming in said shell.

18. A surfboard according to claim 17 wherein:
one of said upper and lower passages having enlarged ports for injecting foam pellets into said mold, and the other passage having relatively small ports for injecting steam into said mold, both of said passages accessible from said fin box.

19. A surfboard for riding waves in a body of water comprising:
an elongated box-like stringer having a forward end, a rear end, upper and lower surfaces, and curved generally to the longitudinal profile of a surfboard;
an upper passage and a lower passage extending along substantially the length of said stringer;
outlet ports spaced along said stringer and communicating with said passages;
a fin box formed in said stringer at the rear end thereof and communicating with said passages; and
a three dimensional foam body formed around said stringer and having top and bottom outer surfaces defining a surfboard configuration.

20. A surfboard according to claim 19 wherein:
said foam body is a combination of polystyrene and polyurethane; and
said outer surface is of a thin substantially rigid sheet in a polycarbonate material.

* * * * *